US010652184B1

(12) United States Patent
Winter et al.

(10) Patent No.: US 10,652,184 B1
(45) Date of Patent: May 12, 2020

(54) SYSTEM AND METHOD USING BLOCKCHAIN LEDGER AND ZERO KNOWLEDGE PROOF FOR TOKENIZED COMMUNICATIONS

(71) Applicant: Syniverse Technologies, LLC, Tampa, FL (US)

(72) Inventors: Craig Winter, Felton, CA (US); Monique Jeanne Morrow, Zurich (CH)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/715,012

(22) Filed: Dec. 16, 2019

Related U.S. Application Data

(60) Provisional application No. 62/856,209, filed on Jun. 3, 2019.

(51) Int. Cl.
*H04L 12/58* (2006.01)
*H04L 9/32* (2006.01)
*H04L 9/06* (2006.01)

(52) U.S. Cl.
CPC .......... *H04L 51/12* (2013.01); *H04L 9/0637* (2013.01); *H04L 9/3213* (2013.01); *H04L 9/3221* (2013.01)

(58) Field of Classification Search
CPC ..... H04L 51/12; H04L 9/0637; H04L 9/3221; H04L 9/3213
See application file for complete search history.

(56) References Cited

U.S. PATENT DOCUMENTS

| | | | |
|---|---|---|---|
| 2016/0321752 A1* | 11/2016 | Tabacco | G06Q 40/04 |
| 2018/0137512 A1* | 5/2018 | Georgiadis | G06Q 20/065 |
| 2018/0336554 A1* | 11/2018 | Trotter | G06Q 20/3823 |
| 2018/0367310 A1* | 12/2018 | Leong | H04L 9/3239 |
| 2019/0080402 A1* | 3/2019 | Molinari | H04L 9/3239 |
| 2019/0156301 A1* | 5/2019 | Bentov | G06Q 20/027 |
| 2019/0180275 A1* | 6/2019 | Safak | G06Q 20/3825 |
| 2019/0236594 A1* | 8/2019 | Ehrlich-Quinn | G06Q 20/065 |
| 2019/0349261 A1* | 11/2019 | Smith | H04L 41/12 |
| 2020/0042989 A1* | 2/2020 | Ramadoss | G06Q 50/163 |

* cited by examiner

*Primary Examiner* — Michael Won
(74) *Attorney, Agent, or Firm* — Molly L. Sauter; Smith & Hopen, P.A.

(57) ABSTRACT

A Tokenized Communication Service Provider (TCSP) for providing secure messaging between a consumer and a message sender without exposing the consumer communication preferences and Personally Identifiable Information (PII) to the message sender. TCSP issues a communication token to be used for the communication between the consumer and the message sender. Consumer authorization is recorded in a blockchain ledger and a Zero Knowledge Proof mechanism is used to establish that the TCSP possesses the consumer contact information and authorization. The consumer authorization is revocable by the consumer, and the revocation is recorded in the blockchain ledger.

17 Claims, 5 Drawing Sheets

SYSTEM AND METHOD USING BLOCKCHAIN LEDGER AND ZERO KNOWLEDGE PROOF FOR TOKENIZED COMMUNICATIONS

CROSS-REFERENCE TO RELATED APPLICATIONS

This application claims priority to U.S. Provisional Patent Application No. 62/856,209, filed on Jun. 3, 2019 and entitled, "Method of Using Blockchain Ledger and Zero Knowledge Proof for Tokenized Communications".

TECHNICAL FIELD

This invention relates generally to the field of wireless data communication networks and more specifically to a method of using blockchain ledger and zero knowledge proof for secure tokenized communications.

BACKGROUND OF THE INVENTION

Exposure of consumer data to unauthorized parties is a pressing concern for both consumers and enterprises to whom consumers entrust their data. According to the current state of the art, a consumer would typically provide their contact information directly to an enterprise to receive text or email messages from that enterprise. In the content of the present invention, enterprises may include, but are not limited to, businesses of all sizes, groups, clubs, non-profit organizations and schools However, many enterprises lack proper safeguards necessary to adequately protect the consumer contact information entrusted to them. Moreover, some enterprises may sell the consumer contact information to an unauthorized third party without the consumer's consent. Cyber security breaches and data theft are persistent and an unresolved global problem.

Currently, consumers have little recourse if their contact information has been obtained by unauthorized third parties. Consumers often resort to blocking communications from specific bad actors or changing their phone number, email, user identification, etc. These solutions are time-consuming, costly and aggravating. As a result, consumers are becoming unwilling to share their contact information, even with legitimate organizations. Eroding trust makes it increasingly difficult for businesses to acquire contact information and contact authorization from their consumers. The risk of data leakage of personal identifiers, such as phone numbers, device identifications, or email addresses increases each time a consumer shares their personal information with yet another organization. After consumer consent is given to an organization, its revocation is not definitive and there is no visibility into affiliate sharing of personal identifiers.

Thus, there is a strong but, heretofore, unresolved need for a method of ensuring secure communications between enterprises and consumers without exposing the consumers personal information to the enterprises.

SUMMARY OF THE INVENTION

In various embodiments the present invention provides a system and method for ensuring secure messaging between message senders and consumers that does not expose the consumers personal information to the message senders.

In one embodiment, the present invention provides a method for establishing secure messaging between a consumer and one or more message senders. The method utilizes a tokenized communication service provider (TCSP) for receiving messages from one or more message senders and for securely sending the messages to a consumer. The consumer first registers with the TCSP by providing message delivery consent and message delivery preferences for establishing a communication channel between one or more consumer devices and one or more of the message senders. The consumer message delivery consent and message delivery preferences are then stored at the TCSP. In response to the registration, the TCSP issues a communication token to the consumer, wherein the communication token provides a mapping back to the stored consumer message delivery preferences and personal identifiers at the TCSP. Proof of registration and proof of the issuance of the communication token are then posted to a blockchain ledger.

Following the registration of the communication channel between the consumer device and the message sender, the TCSP then transmits the communication token to the consumer so that the consumer can then provide the communication token to the message sender to allow the message sender to send messages to the consumer device. The message sender then sends a message addressed to the communication token to the TCSP. The TCSP verifies that the consumer message delivery consent for the message sender has not been revoked by accessing the blockchain ledger and then delivers the message to the consumer device using the stored consumer message delivery preferences and personal identifiers associated with the communication token when it has been verified that the consumer message delivery consent has not been revoked.

In another embodiment, there may be multiple TCSPs within a network of TCSPs that a consumer can register with. In this embodiment, the consumer may register with a first TCSP and the first TCSP then stores the consumer message delivery preferences and personal identifiers and issues the communication token to the consumer. A second one of the plurality of TCSPs may subsequently receive a message from a message sender using the communication token provided by the consumer. Since the consumer message delivery preferences and personal identifiers are stored at the first TCSP and not at the second TCSP, the second TCSP accesses the blockchain to identify the first TCSP as the TCSP that is storing the consumer message delivery preferences and personal identifiers. The second TCSP then routes the message addressed to the communication to the first TCSP. The first TCSP then proceeds to verify the consumer message delivery consent and delivers the message to the consumer if the requirements have been met by the message sender.

In an additional embodiment, the method may include receiving a request from the consumer to revoke the consumer message delivery consent for the message sender. Upon receiving the revocation request, the TCSP posts the revocation of the consumer message delivery consent for the message sender to the blockchain ledger. Accordingly, when a message is received from the message sender at the TCSP, the method includes verifying that the consumer message delivery consent for the message sender has been revoked based upon the blockchain ledger and blocking the delivery of the message from the TCSP to the consumer device when it has been verified that the consumer message delivery consent has been revoked.

In yet another embodiment, the method may include receiving requests from a plurality of consumers to revoke their message delivery consent for a particular message sender. The method further includes, blacklisting the message sender when the plurality of consumers requesting to revoke their message delivery consent for the message sender exceeds a threshold value and posting the blacklisting of the message sender to the blockchain ledger. Accordingly, when a message is received from the message sender at the TCSP, the method includes verifying that the message sender has been blacklisted based upon the blockchain ledger and blocking the delivery of messages from the blacklisted message sender to the plurality of consumers.

In an additional embodiment, the method may include receiving a request to prove that the message from the sender complies with the consumer message delivery consent, consumer message delivery preferences and personal identifiers. In response to the request, the TCSP may perform a zero knowledge proof function (ZKP), wherein the ZKP function confirms or denies that the TCSP possess the consumer message delivery consent, consumer message delivery preferences and personal identifiers. Following the execution of the ZKP function, the TCSP posts the result of the ZKP to the blockchain ledger.

The present invention additionally provides a system for secure messaging, which includes a blockchain ledger and a tokenized communication service provider (TCSP) in communication with the blockchain ledger and positioned between one or more message senders and a consumer. The TCSP is responsible for registering the consumer, wherein registering comprises, the consumer providing message delivery consent and message delivery preferences for establishing a communication channel between one or more consumer devices and one of the one or more message senders, storing the consumer message delivery consent and message delivery preferences and issuing a communication token to the consumer in response to the consumer registering with the TCSP, wherein the communication token provides a mapping back to the stored consumer message delivery preferences and personal identifiers. The TCSP is additionally responsible for posting proof of the consumer message delivery consent and proof of communication token issuance to the blockchain ledger, transmitting the communication token to the consumer, receiving a message addressed to the communication token from the message sender, wherein the consumer provided the communication token to the message sender, verifying that the consumer message delivery consent for the message sender has not been revoked based upon the blockchain ledger and delivering the message to the consumer device using the stored consumer message delivery preferences and personal identifiers associated with the communication token when it has been verified that the consumer message delivery consent has not been revoked.

The TCSP of the system of the present invention may additionally be configured for revoking consumer consent at the request of the consumer, blacklisting message senders and providing proof that the consumer Personally Identifiable Information (PII) is secure and not accessible to the message senders.

The present invention additionally provides a non-transitory computer-readable media having computer-executable instructions for performing a method of running a software program on a computing device for providing secure messaging, the computing device operating under an operating system, the method including issuing instructions from the software program comprising, providing a tokenized communication service provider (TCSP), the TCSP for receiving messages from one or more message senders and for securely sending the messages to a consumer, registering the consumer with the TCSP, wherein registering comprises, the consumer providing message delivery consent and message delivery preferences for establishing a communication channel between one or more consumer devices and one of the one or more message senders, storing the consumer message delivery preferences and the personal identifiers at the TCSP, issuing, by the TCSP, a communication token to the consumer in response to the consumer registering with the TCSP, wherein the communication token provides a mapping back to the stored consumer message delivery preferences and personal identifiers at the TCSP, posting proof of the consumer message delivery consent and proof of communication token issuance by the TCSP to a blockchain ledger, transmitting the communication token from the TCSP to the consumer, receiving, at the TCSP, a message addressed to the communication token from the message sender, wherein the consumer provided the communication token to the message sender, verifying, at the TCSP, that the consumer message delivery consent for the message sender has not been revoked based upon the blockchain ledger and delivering the message from the TCSP to the consumer device using the stored consumer message delivery preferences and personal identifiers associated with the communication token when it has been verified that the consumer message delivery consent has not been revoked.

The non-transitory computer-readable media may additionally include instructions for revoking consumer consent at the request of the consumer, blacklisting message senders and providing proof that the consumer Personally Identifiable Information (PII) is secure and not accessible to the message senders.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

In various embodiments, the disclosed invention resolves the problem of theft, leakage and unauthorized sharing of consumer contact information. The invention enables organizations to communicate with their consumers without using personal identifiers, such as phone numbers, email addresses or device IDs.

Figure 1:
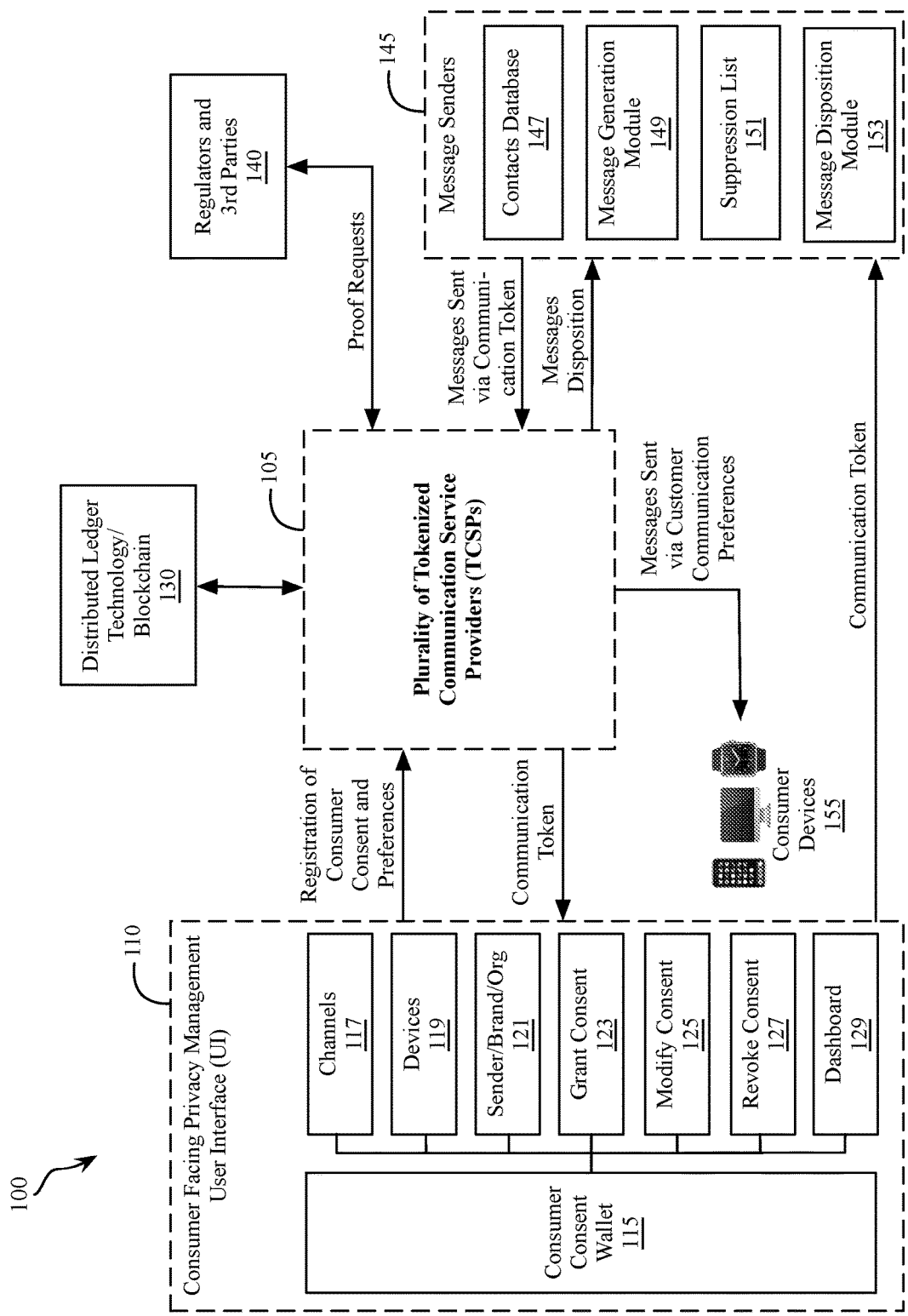
FIG. 1 is a block diagram schematically depicting a system for providing secure messaging, in accordance with an embodiment of the invention.

In an exemplary embodiment of a proxied blockchain based messaging system 100, depicted in FIG. 1, at least one of a plurality of Tokenized Communications Service Providers (TCSPs) 105 is established to perform a communication token issuance and revocation function. In the present invention, the TCSP 105 is an entity that is responsible for sending messages to consumer devices 155 based upon their consent and privacy grants. The TCSP is composed of entities in the messaging delivery ecosystem that require endpoint identifiers to deliver messages, communications, alerts or control signals. As such, the entities in the TCSP 105 may include Short Messaging Service (SMS) aggregators, email service providers and messaging networks. In the present invention, only a TCSP can store actual consumer contact information, and the consumer contact information is not exposed to any enterprises outside of the TCSP 105.

The system 100 further includes, a consumer facing privacy management user interface (UI) 110. The UI 110 may include a consumer consent wallet 115. The consumer consent wallet 115 is an encrypted container of a consumer's communication preferences which may include, various channels 117, devices 119, sender/brand/organization 121. The consumer consent wallet 115 also tracks the instructions proved by the consumer, including the consumer's grant consents 123, modify consent 125, revoke consent 127 and dashboard 129 instructions. In general, the consumer consent wallet 115 is an encrypted container of the consumer's communication preferences. Communication between the consumer and a message sender is established through a consumer channel address which is a globally unique identifier that is used to send messages to the consumer on a specific channel, such as an email address, phone number or user ID associated with a messaging application.

The system 100 further includes a Distributed Ledger Technology device, or in particular a blockchain ledger 130. Blockchain ledgers are commonly known in the art which utilize independent computers, referred to as nodes, to record, share and synchronize transactions in their respective electronic ledgers, instead of keeping data centralized as in a traditional ledger-based system.

The system 100 further includes one or more message senders 145 that want to send messages, such as emails, text messages, etc. to one or more of the consumer devices 155. The message senders 145 may be any of various enterprises that wish to communicate with a consumer using text messaging, emails, or any other communication channel that is unique to the user. The message sender 145 may include a contacts database 147 for storing the communication token issued to a consumer by the TCSP 105. The message sender 145 may additionally include a message generation module 149 for generating the messages to be send to the consumer devices 155, a suppression list 151 for keeping track of consumer devices 155 that should not be communicated with and a message disposition module 153 for receiving and processing the message disposition information from the TCSP 105. The TCSP 105 may notify the message sender 145 of the status of the message. Accordingly, the TCSP may notify the message sender 145 that a particular message has been delivered, rejected, pending etc.

The system 100 may further include regulators and $3^{rd}$ parties 140 that communicate with the TCSP 105 to verify that the consumer PII is secure and has not been exposed to the message senders 145.

In general, a consumer provides their contact information, such as their name, phone number, email address, etc. to the TCSP 105. The consumer also provides their contact preferences to the TCSP 105. The consumer contact preferences may include the messaging means by which the consumer wishes to be contacted, such as, Short Message Service (SMS) message, Rich Communication Services (RCS) message, email, automated phone call, Internet Protocol (IP) based messages, push messages, etc. Messaging applications for delivering messages to the consumer may include WHATSAPP, LINE, WECHAT, VIBER, IMESSAGE, and various other messaging services currently in existence or anticipated in the future.

In a more specific exemplary embodiment regarding the operation of the system of FIG. 1, a consumer may log into their account on a website or mobile application associated with a message sender 145 and navigate to the section of the website or mobile application that allows the consumer to enter their communication preferences. An SDK (Software Development Kit) based form may then be displayed to gather the customer's contact preferences, such as their device channel address (i.e. phone number). The SDK interface collects the customer's contact preferences without allowing the message sender 145 access to the information.

The customer enters their message delivery preferences, such as phone number, time of day and message category preferences for the message sender 145 and submits the SDK based form. The consumer contact preferences are then transmitted to the TCSP 105 via an API (Application Programming Interface) and stored as a consumer contact preferences map at the TCSP 105. The TCSP 105 then generates a communication token based upon the consumer contact preferences and transmits the communication token to the consumer. The communication token is an index into a stored map of the message delivery preferences and consent preferences associated with the consumer. The consumer can manage their communication tokens via the UI 110.

The consumer can then use the UI 110 to provide their communication token to the message sender 145 when they want to receive messages from the message sender 145. The message sender 145 associates the communication token with the consumer in the contacts database 147.

When the message sender 145 wants to send a message to the consumer, the message sender 145 sends the message via API to the TCSP 105. The message includes the communication token of the consumer, the message body and any message handling rules, such as channel priority and fallback. Note that the consumer's message delivery preferences take precedence over the rules provided by the message sender 145 should there be a conflict. The message sender 145 rules may address other message delivery parameters such as cost and channel fallback.

The TCSP 105 additionally utilizes a Zero Knowledge Proof (ZKP) mechanism to prove that it possesses consumer contact information and that it is authorized to send messages to the consumer. The Zero Knowledge Proof mechanism enables the TCSP 105 to prove to regulators and $3^{rd}$ parties 140 that it can send messages to the consumer, without requiring the exposure of the consumer's contact information. Thus, the TCSP 105 keeps the consumer contact information private at all times. In a Zero Knowledge Proof verification mechanism, the TCSP has the role of a "prover." Proof of credential function is generated at the TCSP 105 and recorded in the blockchain ledger 130, which provides regulators 140 with an assurance that the consumer did indeed provide their contact information to the TCSP 105, and that the TCSP 105 is authorized to send messages to the consumer. Because the consumer's contact information is not exposed, the use of the Zero Knowledge Proof mechanism provides an ultimate protection for consumer's information. The ZKP mechanism performed at the TCSP 105 may return a "yes" or "no" response regarding the presence of the consumer consent and consumer channel address validation without disclosing the consumer information to the regulators or $3^{rd}$ parties 140.

Figure 2:
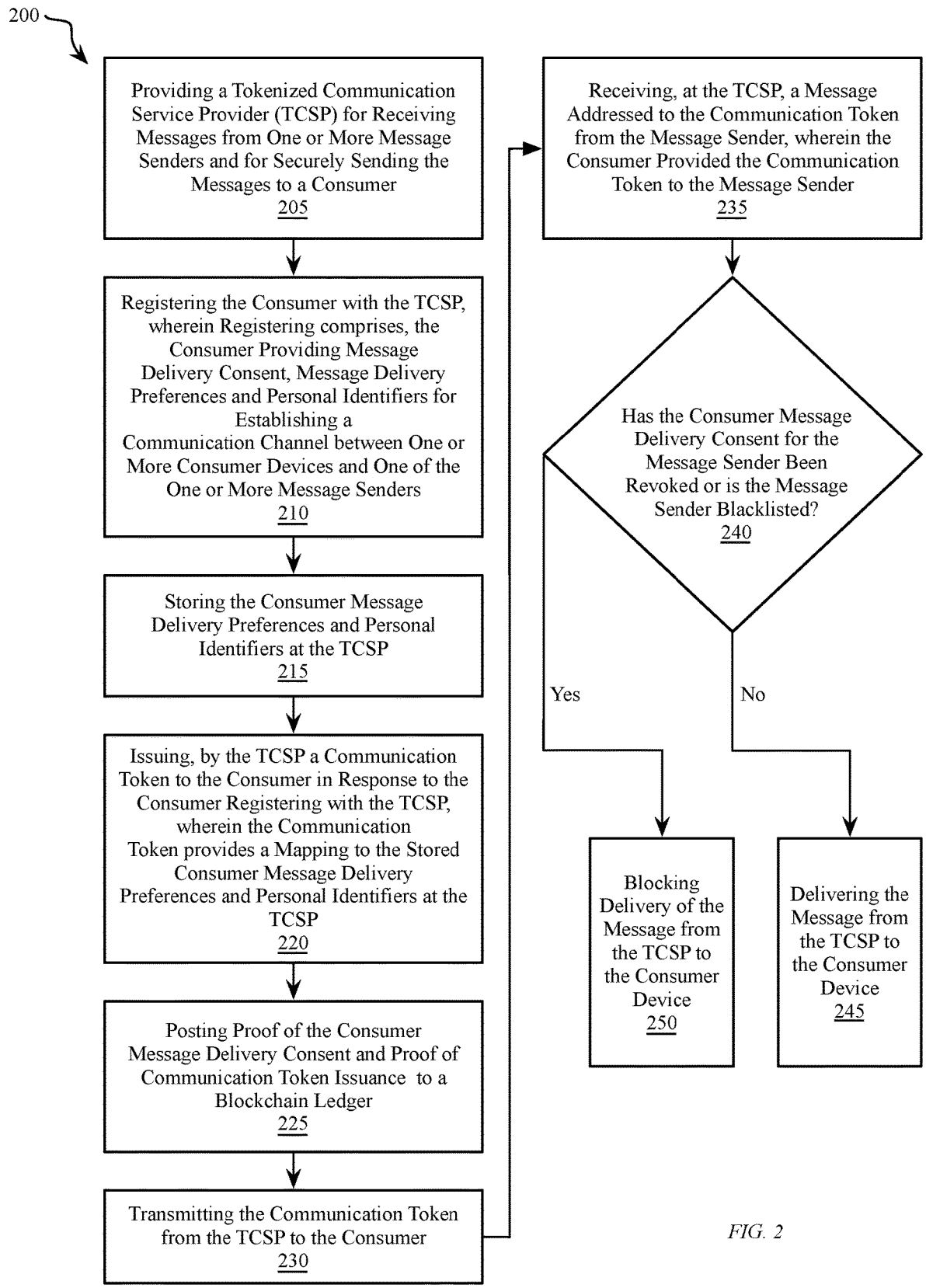
FIG. 2 is a flowchart depicting a method for providing secure messaging, in accordance with an embodiment of the present invention utilizing a single TCSP.

FIG. 2 is a flow diagram 200 illustrating a method for providing secure messaging, in accordance with an embodiment of the present invention.

With reference to FIG. 2, in a first step 205 a tokenized communication service provider (TCSP) is positioned to be in communication with one or more consumers and one or more messages senders, wherein the message senders want to send messages to the one or more consumers. The TCSP may be an SMS aggregator, an email service provider or messaging network. However, this is not intended to be limiting and other means for communicating messages between senders and consumers are within the scope of the present invention.

At step 210, if a consumer wishes to be contacted by one or more of the message senders, the consumer registers with the TCSP by providing message delivery consent and message delivery preferences to establish a communication channel between the consumer and the one or more message senders. At step 215, the TCSP stores the consumer message preferences and at step 220 the TCSP issues a communication token to the consumer. The communication token provides a mapping to the stored consumer message delivery preferences and personal identifiers. At step 225, the TCSP posts proof of the consumer message delivery consent and proof of the token issuance to a blockchain ledger. At step 230 the communication token is transmitted to the consumer.

If a consumer wishes to be contacted by a message sender, the consumer provides the communication token to the enterprise, without disclosing their contact information. At step 235, the TCSP receives a message addressed to the communication token that was provided to the message sender by the consumer. At step 240, the TCSP verifies the blockchain ledger to ensure that the consumer authorized the message sender to contact them and that the consumer message delivery consent has not been revoked. If the verification is successful, the TCSP then delivers the message to the consumer via the communication channel specified by the consumer at step 245. However, if the verification is unsuccessful, the TCSP will block the delivery of the message to the consumer at step 250.

As described above, consumers can modify or revoke their message delivery consent to a message sender. In one embodiment, the modification or revocation can be based on a channel through which the consumer receives the messages, content preferences, or any rules mutually agreed upon between the consumer and the message sending organization. In one embodiment, a consumer can use UI 110 to view engagement tokens of different use cases and different profiles associated with the preferences submitted by the consumer. For example, the user may be able to view engagement token status, status of contact authorization on the blockchain ledger, and authorized enterprises associated with each engagement token. The consumer has the ability to revoke authorization by cancelling the authorization previously granted to a message sender by the consumer. The result of this revocation is also recorded in the blockchain ledger. Thus, if the message sender attempts to send a message to the communication token after the consumer has revoked the authorization of the message sender, the TCSP will be aware that the enterprise is no longer authorized to contact the user and will not send the message. In an additional embodiment, TCSPs can block one another, thereby protecting the consumer against security breaches.

In an additional embodiment, a message sender can be blacklisted by the TCSP which will prevent any messages from being delivered from that particular message sender to any of the consumers associated with the TCSP. In this embodiment, if a message sender receives a number of revocations of authorization to contact from numerous consumers that exceed a predetermined threshold value, the TCSP may determine that the message sender should be blacklisted. The blacklisting status of the message sender is then posted to the blockchain ledger. Accordingly, in step 240, the TCSP may also be used to verify whether or not the message sender sending the message using the communication token has been blacklisted. If the message sender has not been blacklisted, then the TCSP delivers the message to the consumer at step 245. However, if the message sender has been blacklisted, the TCSP blocks the delivery of the message to the consumer at step 250.

Figure 3:
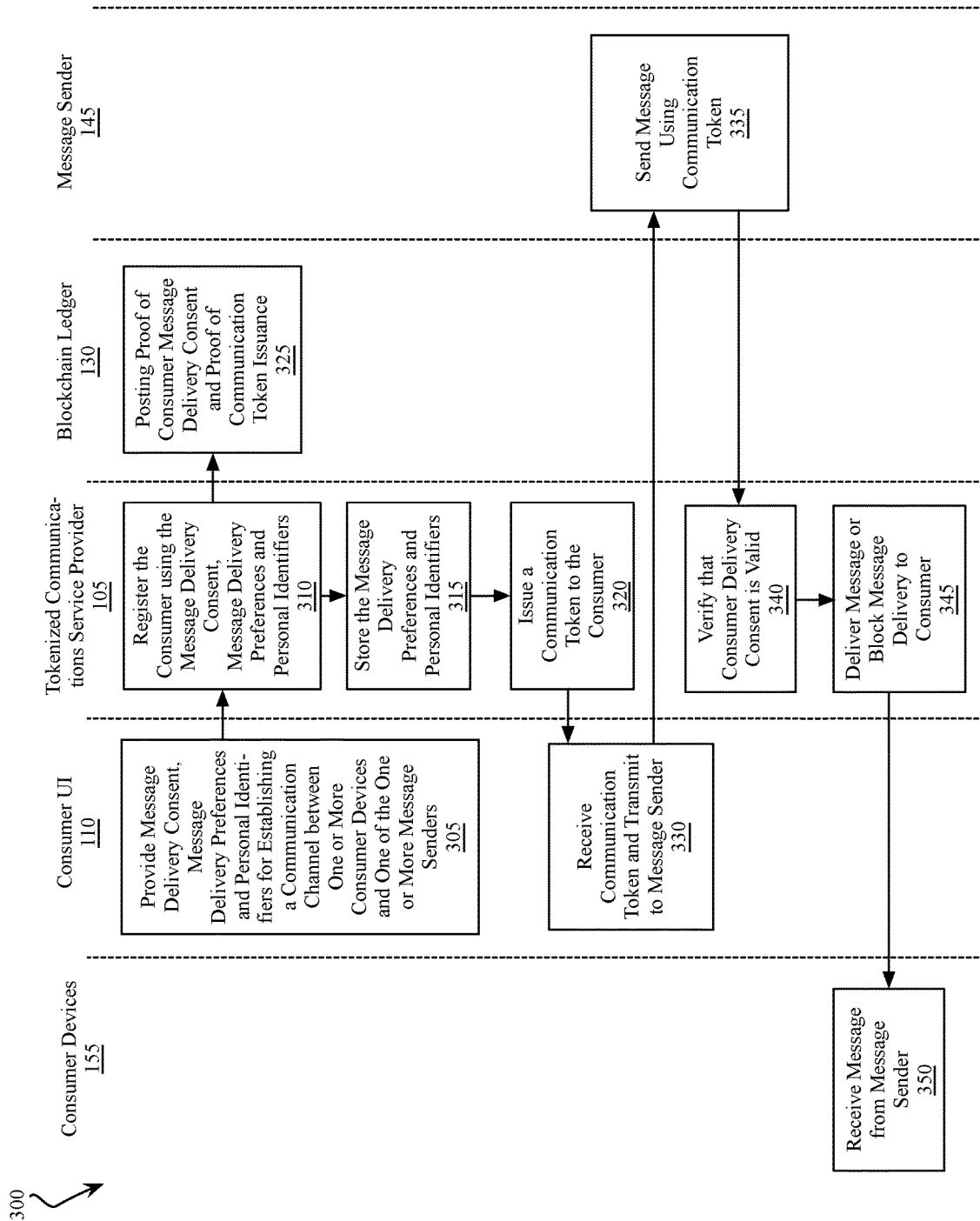
FIG. 3 is swim diagram illustrating a method for providing secure messaging, in accordance with an embodiment of the present invention.

FIG. 3 illustrates a computer implemented method 300 for providing secure messaging in accordance with the present invention. Step 305, a consumer 110 provides message delivery consent and message delivery preferences to a tokenized Communication Service Provider 105 for establishing a communication channel between one or more consumer devices 155 and one or more message senders 145. At step 310, the consumer is registered with the TCSP and the consumer message delivery preferences and personal identifiers are stored in at TCSP at step 315. At step 320 the TCSP 105 issues a communication token to the consumer. The TCSP 105 also posts the proof of consumer message delivery consent and proof of communication token issuance to the blockchain ledger at step 325.

Upon receiving the communication token, at step 330, the consumer provides the communication token to the message sender 145. The message sender 145 then sends a message to the TCSP 105 using the communication token at step 335. At step 340, the TCSP 105 verifies that the consumer delivery consent is valid (i.e. has not been revoked) by querying the blockchain ledger 130. If the consumer delivery consent is valid, the message is delivered to the consumer device at step 345. Upon receipt of the message at the consumer device 155 at step 350, the secure delivery of the message between the consumer and the message sender is considered complete.

Figure 4:
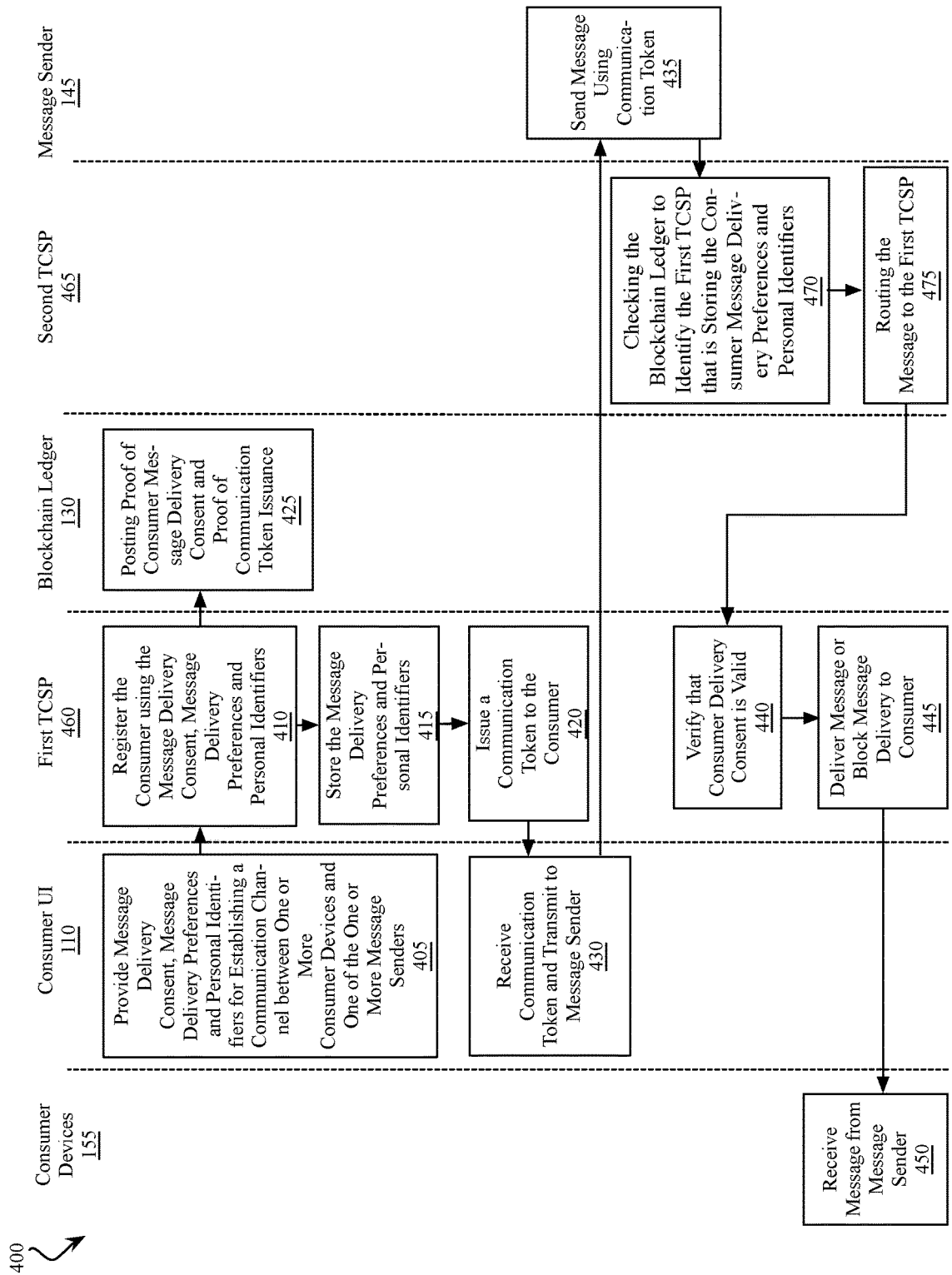
FIG. 4 is a flowchart depicting a method for providing secure message, in accordance with an embodiment of the present invention employing more than one TCSP.

With reference to FIG. 4, in an additional embodiment, more than one TCSP may participate in the message delivery, thereby requiring an additional routing step to route the message addressed to the communication token to the TCSP that is storing the message delivery consent, message delivery preferences and personal identifiers when the message is received at a different one of the plurality of TCSPs. It is commonly known to employ multiple TCSPs within a communication network that a message sender could use to send messages to a consumer. Typically, a TCSP, such as an SMS aggregator or email service provider, would have an agreement with only one TCSP and the consumer's actual address and other PII will only reside with one TCSP, so additional routing steps may be required to reach the TCSP that is storing the desired consumer's personal identifiers.

FIG. 4 illustrates a computer implemented method 400 for providing secure messaging utilizing more than one TCSP, in accordance with the present invention. In this embodiment, a first TCSP 460 of the plurality of TCSPs 105 and a second TCSP 465 of the plurality of TCSPs 105 participate in the delivery of the message to the consumer. However, this is not intended to be limiting and any number of TCSPs may participate in the delivery of the message to the consumer, as would be obvious to one of ordinary skill in the art.

As shown in FIG. 4, at step 405, a consumer 110 provides message delivery consent and message delivery preferences to a first Tokenized Communication Service Provider 460 for establishing a communication channel between one or more consumer devices 155 and one or more message senders 145. At step 410, the consumer is registered with the first TCSP 460 and the consumer message delivery preferences and personal identifiers are stored at the first TCSP 460 at step 415. At step 420 the first TCSP 460 issues a communication token to the consumer. The first TCSP 460 also posts the proof of consumer message delivery consent and proof of communication token issuance to the blockchain ledger at step 425.

Upon receiving the communication token, at step 430, the consumer provides the communication token to the message sender 145. The message sender 145 then sends a message to a second TCSP 465 using the communication token at step 435. Since the second TCSP 465 that received the token is not storing the communication preferences and personal identifiers of the consumer, at step 470, the second TCSP 465 checks the blockchain ledger 130 to identify the first TCSP 460 that is storing the communication preferences and personal identifiers for the consumer. The second TCSP 465 then routes the message to the first TCSP 460 at step 475.

At step 440, the first TCSP 105 receives the message from the second TCSP 465 and then verifies that the consumer delivery consent is valid (i.e. has not been revoked) by querying the blockchain ledger 130. If the consumer delivery consent is valid, the message is delivered to the consumer device at step 445. Upon receipt of the message at the consumer device 155 at step 450, the secure delivery of the message between the consumer and the message sender is considered complete.

Figure 5:
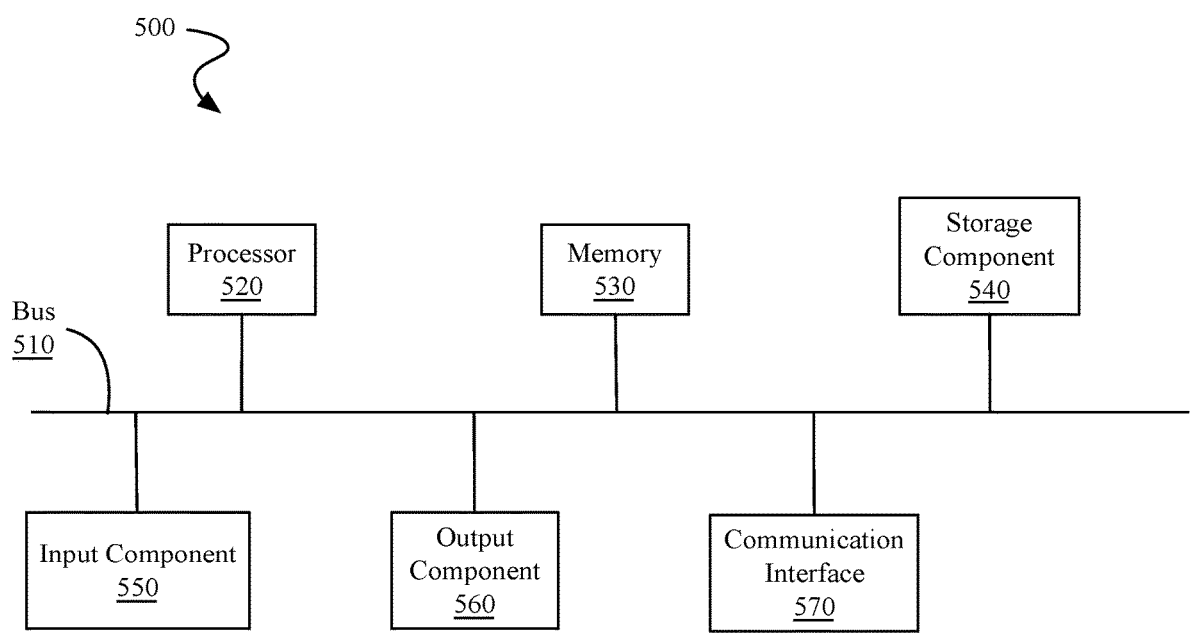
FIG. 5 is a block diagram illustrating the components of a Tokenized Communication Service Provider (TCSP), in accordance with an embodiment of the present invention.

FIG. 5 is a block diagram 500 illustrating the components of an exemplary Tokenized Communication Service Provider (TCSP), in accordance with the present invention. As shown in FIG. 5, the TCSP includes a processor 520 and one or more memory devices 530 storing computer-executable instructions that, when executed with the processor, cause the system to at least, be positioned between one or more message senders and a consumer, register the consumer, wherein registering comprises, the consumer providing message delivery consent, message delivery preferences and personal identifiers for establishing a communication channel between one or more consumer devices and one of the one or more message senders, store the consumer message delivery preferences, issue a communication token to the consumer in response to the consumer registering with the TCSP, wherein the communication token provides a mapping back to the stored consumer message delivery preferences and personal identifiers, post proof of the consumer message delivery consent and proof of communication token issuance to the blockchain ledger, transmit the communication token to the consumer, receive a message addressed to the communication token from the message sender, wherein the consumer provided the communication token to the message sender, verify that the consumer message delivery consent for the message sender has not been revoked based upon the blockchain ledger and deliver the message to the consumer device using the stored consumer message delivery preferences and personal identifiers associated with the communication token when it has been verified that the consumer message delivery consent has not been revoked.

In some implementations, a TCSP 105 for implementing the secure message delivery system shown in FIG. 1, may include one or more components of the TCSP device 500. As shown in FIG. 5, the TCSP 500 may include a bus 510, a processor 520, a memory 530, a storage component 540, an input component 550, an output component 560, and a communication interface 570.

Bus 510 may include circuitry that permits communication among the components of the TCSP 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 may include a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 may be configured for storing information and/or software related to the operation and use of the TCSP 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 may include circuitry that allows the TCSP 500 to receive information, such as via user input, such as, a touch screen display, a keyboard, a keypad, a mouse, a button, a switch, and/or a microphone. Output component 560 may include a component that provides output information from the TCSP 500, such as a display or a speaker.

Communication interface 570 may include a transceiver circuitry that allows the TCSP 500 to communicate with other devices, such as via a wired connection, a wireless connection, or a combination of wired and wireless connections. Communication interface 570 may allow the TCSP 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

The TCSP 500 may perform one or more processes described herein. The TCSP 500 may perform these processes based on the processor 520 executing software instructions stored by a non-transitory computer-readable medium, such as a memory 530 and/or storage component 540.

The specific arrangement of components shown in FIG. 4 are provided as an exemplary embodiment. In practice, the TCSP 500 may include additional components, fewer components, different components, or differently arranged components than those illustrated in FIG. 4.

Some of the advantages achieved by the invention include increased trust by consumers because the consumers will know that only the TCSP will have their contact information and that their contact information will not be exposed to any enterprises (i.e. message senders), even those whom the consumer authorizes to contact them. The Zero Knowledge Proof (ZKP) mechanism enables the TCSP to maintain consumer info in complete privacy, while providing enterprises with adequate assurance that the TCSP can send messages to the consumer. Because the consumers do not need to provide their contact information to enterprises and can definitively revoke the authorization to be contacted, consumers will be less reluctant to authorize enterprises to contact them. Another objective of the invention is to increase accountability for enterprises, which will reduce the number of spam messages sent to consumers and increase the efficacy of communications between enterprises and consumers. Yet another objective of the invention is to reduce the risk and simplify compliance with various legal privacy requirements by eliminating the need for enterprises to store consumers personal contact information. In addition, consumers will have the ability to revoke authorization if an enterprise does not comply with consumer's expressed preferences regarding enterprise communications.

The various techniques described herein can be implemented in connection with hardware or software or, where appropriate, with a combination of both. Thus, the methods and system, such as the TCSP, the Consumer Facing Privacy Management User Interface and the Message Senders, described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for secure messaging, the method comprising:
    providing at least one tokenized communication service provider (TCSP), the at least one TCSP for receiving messages from one or more message senders and for securely sending the messages to a consumer;
    registering the consumer with the at least one TCSP, wherein registering comprises, the consumer providing message delivery consent, message delivery preferences and personal identifiers for establishing a communication channel between one or more consumer devices and one of the one or more message senders;
    storing the consumer message delivery preferences at the at least one TCSP;
    issuing, by the at least one TCSP, a communication token to the consumer in response to the consumer registering with the at least one TCSP, wherein the communication token provides a mapping back to the stored consumer message delivery preferences and personal identifiers at the at least one TCSP;
    posting proof of the consumer message delivery consent and proof of communication token issuance by the at least one TCSP to a blockchain ledger;
    transmitting the communication token from the at least one TCSP to the consumer;
    receiving, at the at least one TCSP, a message addressed to the communication token from the message sender, wherein the consumer provided the communication token to the message sender;
    receiving, at the at least one TCSP, a request to prove that the message from the sender complies with the consumer message delivery consent, consumer message delivery preferences and personal identifiers;
    performing a zero knowledge proof function (ZKP) at the at least one TCSP in response to receiving a request to prove that the sender complies with the consumer message delivery consent, consumer message delivery preferences and personal identifiers, wherein the ZKP function confirms or denies that the TCSP possess the consumer message delivery consent, consumer message delivery preferences and personal identifiers of the consumer; and
    posting the result of the ZKP to the blockchain ledger;
    verifying, at the at least one TCSP, that the consumer message delivery consent for the message sender has not been revoked based upon the blockchain ledger; and
    delivering the message from the at least one TCSP to the consumer device using the stored consumer message delivery preferences and personal identifiers associated with the communication token when it has been verified that the consumer message delivery consent has not been revoked.

2. The method of claim 1, wherein the at least one TCSP further comprises a plurality of TCSPs, the method further comprising:
    registering the consumer with a first one of the plurality TCSPs;
    storing the consumer message delivery preferences and personal identifiers at the first TCSP;
    issuing, by the first TCSP, the communication token to the consumer in response to the consumer registering with the first TCSP, wherein the communication token provides a mapping back to the stored consumer message delivery preferences and personal identifiers at the first TCSP;
    posting proof of the consumer message delivery consent and proof of communication token issuance by the first TCSP to the blockchain ledger;
    transmitting the communication token from the first TCSP to the consumer;
    receiving, at a second one of the plurality TCSPs, the message addressed to the communication token from the message sender, wherein the consumer provided the communication token to the message sender;

checking, at the second TCSP, the blockchain ledger to identify the first TCSP that is storing the consumer message delivery preferences;

routing the message addressed to the communication token from the second TCSP to the first TCSP;

verifying, at the first TCSP, that the consumer message delivery consent for the message sender has not been revoked based upon the blockchain ledger; and delivering the message from the first TCSP to the consumer device using the stored consumer message delivery preferences and personal identifiers associated with the communication token when it has been verified that the consumer message delivery consent has not been revoked.

3. The method of claim 1, further comprising:

receiving, at the at least one TCSP, a request from the sender to revoke the consumer message delivery consent for the message sender;

posting the revocation of the consumer message delivery consent for the message sender to the blockchain ledger;

verifying, at the at least one TCSP, that the consumer message delivery consent for the message sender has been revoked based upon the blockchain ledger; and blocking the delivery of the message from the at least one TCSP to the consumer device when it has been verified that the consumer message delivery consent has been revoked.

4. The method of claim 1, further comprising:

receiving, at the at least one TCSP, a request from a plurality of consumers to revoke their message delivery consent for the message sender;

blacklisting the message sender when the plurality of consumers requesting to revoke their message delivery consent for the message sender exceeds a threshold value;

posting the blacklisting of the message sender to the blockchain ledger;

verifying, at the at least one TCSP, that the message sender has been blacklisted based upon the blockchain ledger; and blocking the delivery of messages from the blacklisted message sender to the plurality of consumers.

5. The method of claim 1, further comprising, providing delivery confirmation from the at least one TCSP to the one or more message senders following the delivery of the message to the consumer.

6. The method of claim 1, wherein the one or more messages are selected from a Short Message Service (SMS) message, a Rich Communication Services (RCS) message, an Internet Protocol (IP) based message, an email message and a push message.

7. The method of claim 1, wherein the message delivery preferences comprise a globally unique email address, phone number or user ID for establishing the communication channel between the consumer and the one or more message senders.

8. A system for secure messaging, the system comprising:

a blockchain ledger;

at least one tokenized communication service provider (TCSP) in communication with the blockchain ledger and positioned between one or more message senders and a consumer, the at least one TCSP for;

registering the consumer, wherein registering comprises, the consumer providing message delivery consent, message delivery preferences and personal identifiers for establishing a communication channel between one or more consumer devices and one of the one or more message senders;

storing the consumer message delivery preferences;

issuing a communication token to the consumer in response to the consumer registering with the at least one TCSP, wherein the communication token provides a mapping back to the stored consumer message delivery preferences and personal identifiers;

posting proof of the consumer message delivery consent and proof of communication token issuance to the blockchain ledger;

transmitting the communication token to the consumer;

receiving a message addressed to the communication token from the message sender, wherein the consumer provided the communication token to the message sender;

receiving, at the at least one TCSP, a request to prove that the message from the sender complies with the consumer message delivery consent, consumer message delivery preferences and personal identifiers;

performing a zero knowledge proof function (ZKP) at the at least one TCSP in response to receiving a request to prove that the from the sender complies with the consumer message delivery consent, consumer message delivery preferences and personal identifiers, wherein the ZKP function confirms or denies that the TCSP possess the consumer message delivery consent, consumer message delivery preferences and personal identifiers; and posting the result of the ZKP to the blockchain ledger;

verifying that the consumer message delivery consent for the message sender has not been revoked based upon the blockchain ledger; and delivering the message to the consumer device using the stored consumer message delivery preferences and personal identifiers associated with the communication token when it has been verified that the consumer message delivery consent has not been revoked.

9. The system of claim 8, wherein the at least one TCSP further comprises a plurality of TCSPs, further comprises:

a first one of the plurality of TCSPs for;

registering the consumer;

storing the consumer message delivery preferences and personal identifiers;

issuing the communication token to the consumer in response to the consumer registering with the first TCSP, wherein the communication token provides a mapping back to the stored consumer message delivery preferences and personal identifiers at the first TCSP;

posting proof of the consumer message delivery consent and proof of communication token issuance to the blockchain ledger;

transmitting the communication token to the consumer;

a second one of the plurality of TCSPs for;

receiving the message addressed to the communication token from the message sender, wherein the consumer provided the communication token to the message sender;

checking the blockchain ledger to identify the first TCSP that is storing the consumer message delivery preferences;

routing the message addressed to the communication token to the first TCSP;

the first TCSP further for;
   verifying that the consumer message delivery consent for the message sender has not been revoked based upon the blockchain ledger; and
   delivering the message to the consumer device using the stored consumer message delivery preferences and personal identifiers associated with the communication token when it has been verified that the consumer message delivery consent has not been revoked.

10. The system of claim 8, wherein the at least one TCSP is further for:
   receiving a request from the sender to revoke the consumer message delivery consent for the message sender;
   posting the revocation of the consumer message delivery consent for the message sender to the blockchain ledger;
   verifying that the consumer message delivery consent for the message sender has been revoked based upon the blockchain ledger; and
   blocking the delivery of the message to the consumer device when it has been verified that the consumer message delivery consent has been revoked.

11. The system of claim 8, wherein the at least one TCSP is further for:
   receiving a request from a plurality of consumers to revoke their message delivery consent for the message sender;
   blacklisting the message sender when the plurality of consumers requesting to revoke their message delivery consent for the message sender exceeds a threshold value;
   posting the blacklisting of the message sender to the blockchain ledger;
   verifying that the message sender has been blacklisted based upon the blockchain ledger; and
   blocking the delivery of messages from the blacklisted message sender to the plurality of consumers.

12. The system of claim 8, wherein the at least one TCSP further provides delivery confirmation to the one or more message senders following the delivery of the message to the consumer.

13. The system of claim 8, wherein the one or more messages are selected from a Short Message Service (SMS) message, a Rich Communication Services (RCS) message, an Internet Protocol (IP) based message, an email message and a push message.

14. A non-transitory computer-readable media having computer-executable instructions for performing a method of running a software program on a computing device for providing secure messaging, the computing device operating under an operating system, the method including issuing instructions from the software program comprising:
   providing at least one tokenized communication service provider (TCSP), the at least one TCSP for receiving messages from one or more message senders and for securely sending the messages to a consumer;
   registering the consumer with the at least one TCSP, wherein registering comprises, the consumer providing message delivery consent, message delivery preferences and personal identifiers for establishing a communication channel between one or more consumer devices and one of the one or more message senders;
   storing the consumer message delivery preferences at the at least one TCSP;
   issuing, by the at least one TCSP, a communication token to the consumer in response to the consumer registering with the at least one TCSP, wherein the communication token provides a mapping back to the stored consumer message delivery preferences and personal identifiers at the at least one TCSP;
   posting proof of the consumer message delivery consent and proof of communication token issuance by the at least one TCSP to a blockchain ledger;
   transmitting the communication token from the at least one TCSP to the consumer;
   receiving, at the at least one TCSP, a message addressed to the communication token from the message sender, wherein the consumer provided the communication token to the message sender;
   receiving, at the at least one TCSP, a request to prove that the message from the sender complies with the consumer message delivery consent, consumer message delivery preferences and personal identifiers;
   performing a zero knowledge proof function (ZKP) at the at least one TCSP in response to receiving a request to prove that the from the sender complies with the consumer message delivery consent, consumer message delivery preferences and personal identifiers, wherein the ZKP function confirms or denies that the TCSP possess the consumer message delivery consent, consumer message delivery preferences and personal identifiers; and
   posting the result of the ZKP to the blockchain ledger;
   verifying, at the at least one TCSP, that the consumer message delivery consent for the message sender has not been revoked based upon the blockchain ledger; and
   delivering the message from the at least one TCSP to the consumer device using the stored consumer message delivery preferences and personal identifiers associated with the communication token when it has been verified that the consumer message delivery consent has not been revoked.

15. The non-transitory computer-readable media of claim 14, wherein the at least one TCSP further comprises a plurality of TCSPs, the media further comprising instructions for:
   registering the consumer with a first one of the plurality TCSPs;
   storing the consumer message delivery preferences and personal identifiers at the first TCSP;
   issuing, by the first TCSP, the communication token to the consumer in response to the consumer registering with the first TCSP, wherein the communication token provides a mapping back to the stored consumer message delivery preferences and personal identifiers at the first TCSP;
   posting proof of the consumer message delivery consent and proof of communication token issuance by the first TCSP to the blockchain ledger;
   transmitting the communication token from the first TCSP to the consumer;
   receiving, at a second one of the plurality TCSPs, the message addressed to the communication token from the message sender, wherein the consumer provided the communication token to the message sender;
   checking, at the second TCSP, the blockchain ledger to identify the first TCSP that is storing the consumer message delivery preferences;
   routing the message addressed to the communication token from the second TCSP to the first TCSP;

verifying, at the first TCSP, that the consumer message delivery consent for the message sender has not been revoked based upon the blockchain ledger; and delivering the message from the at least one TCSP to the consumer device using the stored consumer message delivery preferences and personal identifiers associated with the communication token when it has been verified that the consumer message delivery consent has not been revoked.

16. The non-transitory computer-readable media of claim 14, further comprising instructions for:

receiving, at the at least one TCSP, a request from the sender to revoke the consumer message delivery consent for the message sender;

posting the revocation of the consumer message delivery consent for the message sender to the blockchain ledger;

verifying, at the at least one TCSP, that the consumer message delivery consent for the message sender has been revoked based upon the blockchain ledger; and blocking the delivery of the message from the at least one TCSP to the consumer device when it has been verified that the consumer message delivery consent has been revoked.

17. The non-transitory computer-readable media of claim 14, further comprising instructions for:

receiving, at the at least one TCSP, a request from a plurality of consumers to revoke their message delivery consent for the message sender;

blacklisting the message sender when the plurality of consumers requesting to revoke their message delivery consent for the message sender exceeds a threshold value;

posting the blacklisting of the message sender to the blockchain ledger;

verifying, at the at least one TCSP, that the message sender has been blacklisted based upon the blockchain ledger; and blocking the delivery of messages from the blacklisted message sender to the plurality of consumers.

* * * * *